Nov. 14, 1961  A. B. SLATER ET AL  3,009,119
FERRITE CIRCULATORS
Filed Sept. 30, 1957

ALTERNATING CURRENT SOURCE

INVENTORS
ARTHUR B. SLATER
THOMAS H. BAKER
HERBERT PARKER MINOT

BY Elmer J. Gorn
ATTORNEY

United States Patent Office 3,009,119
Patented Nov. 14, 1961

3,009,119
FERRITE CIRCULATORS
Arthur B. Slater, Lexington, and Thomas H. Baker, Bedford, Mass., and Herbert Parker Minot, Hudson, N.H., assignors to Raytheon Company, a corporation of Delaware
Filed Sept. 30, 1957, Ser. No. 688,803
15 Claims. (Cl. 333—24)

This invention relates to ferromagnetic rotators or more particularly to ferrite-loaded waveguide structures of high input impedance capable of obtaining, at frequencies of the order of megacycles, maximum polarization rotation of energy traveling from a microwave source in the electromagnetic wave transmission system.

Ferrite rotators or circulators utilizing the Faraday rotation effect have been constructed which consist of a longitudinally-magnetized ferrite rod axially positioned within a conductive pipe or other waveguide structure. By means of such devices a plane or linearly polarized electromagnetic wave at microwave frequencies can be rotated when propagated through the ferromagnetic material which is magnetized in the direction of propagation of the wave by magnetic field producing means whose field strength is below that at which saturation or ferromagnetic resonance in the ferrite occurs. In circulator devices of this type, commonly referred to as ferrite modulators, the magnetic field applied to the ferrite material is usually produced by a plurality of turns surrounding the circular waveguide in the region of the ferrite element to form a high frequency alternating current or modulation winding to provide an alternating current magnetic field when energized by an alternating current source and, thereby, to obtain polarization rotation of microwave energy traveling through the waveguide. Direct current may be applied to the field coil of a ferrite modulator to produce static rotation in which the field coil of the ferrite modulator of this type is fed with high frequency alternating current, for example, from 2 to 30 megacycles, circulating currents produce eddy current losses in the guide material on which the modulating current field coil is wound and induces a counter magnetic field in opposition to the driving field. In this manner, the waveguide acts like a shorted transformer turn to the modulation winding and necessitates a substantial increase in the driving power requirements. Moreover, as the modulating frequency is increased for use in single sideband generators, modulators, and the like, it becomes necessary to decrease the number of turns in the modulation coil in order to stay below resonance and, consequently, the ratio of the shorted turn of the waveguide to the turns in the field coil or modulation winding increases, resulting in increased eddy current losses in the guide material. This necessitates even greater increases in the modulator driving power. Attempts have been made to eliminate or lessen eddy current losses by placing a longitudinal slot in the wall of the waveguide which is oriented in the average position to the electromagnetic E vector with the result that leakage, although reduced, is still high because the null point of the electromagnetic wave rotates out of conformity with the slot during the application of a modulating voltage to the field coil. In numerous applications, therefore, it would be desirable to obtain maximum Faraday rotation of the plane of polarization of electromagnetic wave energy traveling along a microwave transmission path without introducing a high eddy current loss in the waveguide material.

In accordance with the invention, a device for producing a Faraday rotation of the plane of polarization at frequencies of the order of megacycles with substantially reduced eddy current losses in the waveguide material and without substantial leakage of microwave energy in a waveguide section, can be achieved by providing a ferrite element mounted in a waveguide which is slotted along its longitudinal length, and by enclosing the waveguide section in the region of a ferrite element with a layer or spacer of a metallic material composed of particles of a conducting material held in suspension in an epoxy resin or similar type binder, the material filling the longitudinal slot in the waveguide substantially eliminating microwave leakage by providing a conducting path or metallic short for microwaves and at the same time presenting a high resistance or open circuit to energy at the modulating or driving frequency. By thus spacing the field coil windings away from the metallic waveguide, eddy currents and capacitive coupling between turns are minimized, while magnetic coupling to the ferrite element remains substantially unchanged.

The invention further discloses a modification of the above-described ferrite rotator in which input and output connecting flanges are attached to the ferrite-loaded section of a waveguide in order to couple one waveguide section to another. These flanges, extending outwardly from the waveguide, constitute a metal turn which would short out the longitudinal slot and again cause eddy current losses, unless each flange is modified to present a relatively high impedance to the slotted waveguide at the driving frequency. This can be achieved by providing an additional slot in each flange preferably extending concentrically for an equal arcuate distance from the end portion of the longitudinal slot and in register therewith, or for the entire angular distance in order to present an open circuit to eddy currents in the waveguide section and, further, by filling the circular slot with the aforementioned epoxy loaded metal powder compound to be described in detail later. Thus, the slotted and magnetic filled waveguide section presents a solid conducting surface or mismatch to microwaves passing therethrough and a high impedance to the relatively lower frequency driving current applied to the field coil wound upon this magnetic spacing material.

Other objects and advantages will be more readily perceived upon analysis of the accompanying drawing; in which.

Figure 1:
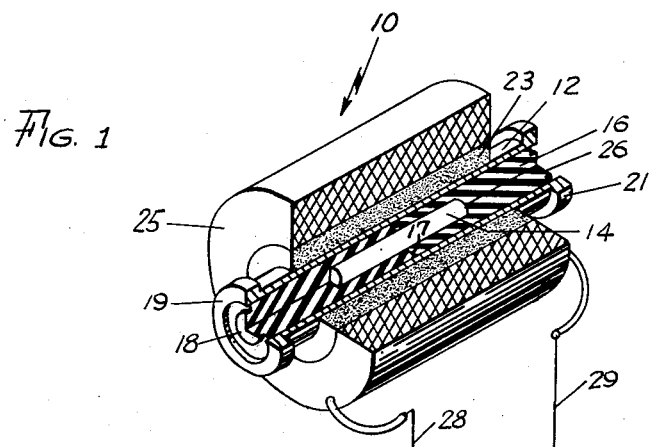
FIG. 1 is an isometric view, partly in section, of one form of rotator device in accordance with the principles of the present invention.
Figure 2:
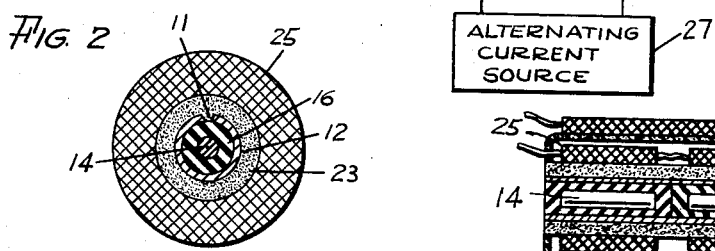
FIG. 2 is a sectional view of the device shown in FIG. 1.

Referring to FIGS. 1 and 2, a ferrite circulator or rotator is indicated generally by reference numeral 10 and includes a circular waveguide section 12 containing a longitudinal slot 11, as shown in FIG. 2, a cylindrical ferrite element 14 positioned within the waveguide section 12 by means of a low-loss dielectric material 16 such as, Teflon, which acts as a solid-supporting medium for the ferrite element 14. The Teflon dielectric material may be cut to the inner diameter of the circular waveguide section 16, divided into two sections as shown at 17 in the region of the ferrite element, a hole bottom-drilled in each section, and the ferrite element slidably inserted into the Teflon. Numerous methods for mounting the ferrite within the Teflon will suggest itself to those skilled in the art. For example, the Teflon may be heated until soft and forced into the desired portion of the waveguide. At each end of the Teflon dielectric 16 and integral therewith, are Teflon matching buttons 18 and 26 adapted to provide a standard matching connection from each end of the circular waveguide section 12 to a rectangular, squared, or circular waveguide member, which may be secured thereto by flanges 19 and 21, one or more of which may be rotatable, or in any other suitable manner known to the prior art. A microwave generator, not shown, such as a magnetron or glystron oscillator, can be used as a source of microwave energy. The energy can be injected into the waveguide connected to the input flange 19 through an input line, not shown, which may be part of the magnetron. Any type of microwave generator and any standard type of matching means for transferring linearly polarized energy into the ferrite rotator 10 may be used provided that the proper polarization and mode of energy is obtained. The waveguide so connected should have a transverse dimension large enough to support the desired transverse electric mode so as to propagate the energy.

In accordance with the invention, the ferrite device 10 further includes a metallic material, for example, aluminum powder which is capable of reflecting microwave radiation, suspended in epoxy resin and which is used as a spacer material surrounding the circular waveguide 12 in the region of the ferrite element 14 and is embedded in the longitudinal waveguide slot. The above material is an example of a general class of materials which for convenience may be termed conductite. As used in the specification and claims hereof the term "conductite" means a finely divided metallic material capable of reflecting microwave radiation, dispersed through a solid insulating material. In this manner, eddy currents flowing in the waveguide 12 are minimized when an alternating current magnetic field is applied to the ferrite by means of a field coil 25. The field coil, in turn, is supported by the aforementioned frequency selective material or conductite 23.

It should be understood that the aforementioned metallic compound or conductite may consist of any suspension of conducting particles in an epoxy type resin or similar insulating binding material. A compound of this type, which has been successfully used, is made by powdering aluminum until the largest particles passed a 100-mesh screen, mixing this powder with an epoxy type polymer, commercially known as Shell Chemical Corporation "Epon 828 resin" heated to 212° F. to drive out moisture, in the proportion of 60 parts by weight of aluminum powder to resin, and adding 117.4 parts by weight of hardening compound for epoxy resins, such as Hooker Electrochemical Company "HET" Anhydride, the chemical term for which is 1,4,5,6,7.7—hexachlorobicyclo(2, 2.1)-5-heptene—2.3dicarboxylic anhydride. After heating at 248° F. to 260° F. for 3 or 4 minutes, the mixture is poured into a suitable mold or recessed waveguide structure and allowed to cool slowly to room temperature before removing from the mold to prevent cracking of the conductite material. The compound is then permitted to harden before being used as a spacer support for the ferrite field coil.

The alternating current field applied to the ferrite element 14 may consist of a source of alternating current 27, adapted to energize the field coil 25 by way of leads 28 and 29. The field coil 25, in this embodiment, consists of 130 turns of No. 7–41 Litz wire wound directly on the conductite material in the vicinity of the ferrite rod 14 and energized by a source of 60 volts alternating current at a frequency of 2 megacycles. In this manner, longitudinally polarized microwaves at X band frequencies traveling through waveguide 12 are rotated with substantially zero leakage of microwave energy through the waveguide slot because of the conductite material, which, as noted, acts as a solid metal conductive surface to microwaves and as a high impedance to the low frequency driving current. FIG. 2 shows the relative size of the longitudinal slot which extends for the length of the Teflon-loaded waveguide 12.

Figure 3:
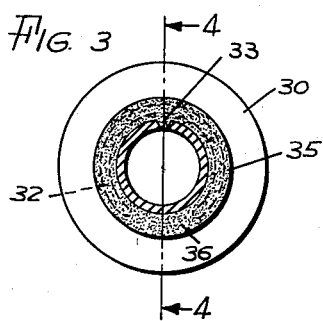
FIG. 3 is a sectional view of another embodiment of the invention.
Figure 4:
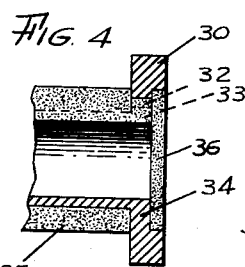
FIG. 4 is a cross-sectional view taken along line 4—4 of FIG. 3.
Figure 5:
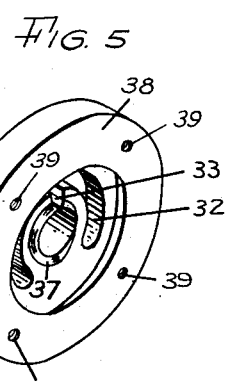
FIGS. 5 and 6 are isometric views showing the circulator having flanges which are recessed to permit loading with magnetic material.

Referring now to FIGS. 3 and 4, the ferrite rotator shown in FIG. 1 may be constructed in a manner which is more satisfactory from a mechanical strength viewpoint, which provides a path for conduction of heat from the ferrite rotator assembly, and which permits the use of flanges for connecting one waveguide section to another. In this embodiment a flange 30 contains an arcuate slot 32 extending from longitudinal slot 33, in the manner shown in FIG. 5, and in register therewith, for a greater portion of the distance around said flange and forming a supporting member 34 integral with waveguide 35, as shown in FIG. 5, and, as noted, providing a path for conduction of heat from the rotator assembly. By using this construction, the length of the rotator as determined by the field coil windings can be reduced one-half to two-thirds, depending, in part, upon the modulation frequency of the unit with which it is to be used. It should be noted that the supporting member 34 formed by the slot 32 is on the opposite side of the flange from the point where the end of the longitudinal slot 33 is in register with the arcuate slot. This results in substantially low eddy current losses since a slot of this configuration does not tend to short the longitudinal slot 33.

Figure 6:
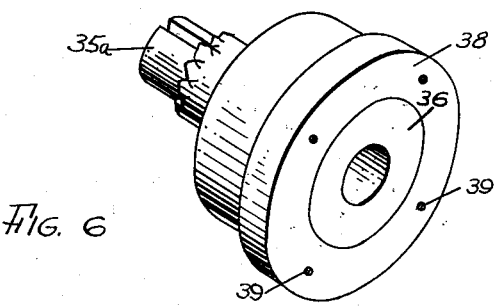

Also, as shown in FIG. 4, the flange 30 is recessed and filled with conductite 36 which also extends around waveguide 35 to maintain the driver winding, not shown, separated from the waveguide and to reduce losses caused by capacitive coupling between turns of the driving coil. The average orientation of the energy in the waveguide 35 is such that no voltage potential exists across the slot 33 and the rotator field coil when wound on the conductite presents a relatively high impedance of 15,000 ohms to the two-megacycle driving power. At the same time, the recess in the flange 30 which is filled with conductite 36, as shown in FIG. 6, offers a shorting surface or mismatch to microwave energy propagating along the waveguide. FIG. 5 shows this recess cut into a flange 38 while FIG. 6 shows this recess filled with conductite and is similar to the embodiment shown in FIG. 4 except that the waveguide 35a in FIG. 6 is permitted to protrude a short distance at 37 into the recess area of the flange 38 to provide a tight coupling to another section of guide without shorting. The flange 38 is shown containing apertures 39 drilled and tapped at evenly spaced intervals to permit joining to another waveguide section.

It should be understood that the length of the ferrite element shown in FIG. 1 exceeds that of its diameter so that the required magnetic field for a given angle of rotation is held relatively low. While the ferrite rotator shown in FIG. 1 is constructed using a single field coil 25, the rotator may be modified to include two or more series-connected field coils evenly spaced along the waveguide in the region of the ferrite element, as shown in FIG. 7, and an additional ferrite rod 14a may be mounted or held in position concentrically within each field coil.

Figure 7:
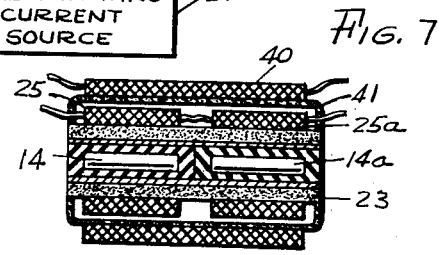
FIG. 7 shows diagrammatically a form of rotator having both alternating current and direct current windings.

Referring to FIG. 7, it may be desirable to wind a direct current winding 40 over each alternating current field coil 25 and 25a to control the average rotation of the rotator. When a direct current winding is added to the alternating current windings, sufficient spacing must be provided to prevent the interaction and consequent loss of Q or magnetic coupling to the alternating current winding. Thus FIG. 7 shows a modification which includes the direct current winding 40 spaced in a well-known manner by a spacer 41, such as polyiron or similar high frequency magnetic core material, to prevent interaction between the windings and at the same time avoid any loss of magnetic coupling to the two ferrite elements 14 and 14a. In this manner, direct current and alternating current fields may be applied simultaneously to the field coils of the ferrite circulator to produce an average or static rotation of the circulator as well as dynamic rotation.

For the foregoing reasons it is to be understood that the above-described arrangements are illustrative of the application of the principles of the invention. Numerous other arrangements may be devised by those skilled in the art without departing from the spirit and scope of the invention. Moreover, the invention is not limited to the particular details of construction, materials, and processes described, as many equivalants will suggest themselves to those skilled in the art. It is accordingly desired that the appendant claims be given a broad interpretation commensurate with the scope of the invention within the art.

What is claimed is:

1. A device for producing rotation of a polarized electro-magnetic wave comprising a circular waveguide receptive of said electromagnetic wave energy, a ferrite element positioned within said waveguide, a longitudinal slot extending along said waveguide in the region of said ferrite element, conductite material comprising conducting particles substantially smaller than a quarter wavelength of the operating frequency of said waveguide filling said slot and positioned on the outer surface of said waveguide adapted to provide a shorted section to prevent electromagnetic wave energy passing through said slot, and a winding supported by said conductite material for providing an axial magnetic field parallel to the direction of propagation of said electromagnetic wave energy.

2. A device for producing rotation of polarized electro-magnetic waves comprising a circular waveguide having a slot extending the length thereof and receptive of said electromagnetic waves, a ferrite element positioned along the longitudinal axis of said waveguide, conductite material comprising conducting particles substantially smaller than a quarter wavelength of the operating frequency of said waveguide filling said slot and positioned around the outer periphery of said waveguide in a manner adapted to provide a shorted section to prevent passage through said slot of said electromagnetic waves passing through said waveguide, a field coil concentrically mounted on said conductite material in the region of said ferrite element, and a source of alternating current feeding said field coil, said conductite material adapted to present a high impedance to said alternating current, whereby eddy current losses in said waveguide are minimized.

3. A device for producing rotation of polarized microwave energy comprising a circular waveguide receptive of said microwave energy and containing a longitudinal slot extending the length of said waveguide, a ferrite element positioned within said waveguide, means positioned in the region of said ferrite element for providing a high frequency electromagnetic field for polarization rotation of said microwave energy propagated in said ferrite element in a predetermined angular direction and, means including electrically conductive particles substantially smaller than a quarter wave-length of the operating frequency of said waveguide interposed between said field producing means and said waveguide for providing a microwave short across said longitudinal slot to prevent passage therethrough of microwave energy passing through said waveguide and a high impedance for said high frequency electromagnetic field energy applied to said ferrite element.

4. In combination, a section of waveguide adapted to receive and support electromagnetic energy and having a longitudinal slot therein, ferrite element means positioned along the longitudinal axis of said waveguide, and means positioned in the region of said ferrite element for providing a high frequency electromagnetic field for polarization rotation of said microwave energy propagated in said ferrite element in a predetermined angular direction, means including electrically conductive particles substantially smaller than a quarter wavelength of the operating frequency of said waveguide interposed between said field-producing means and said waveguide for providing a microwave short across the longitudinal slot to prevent passage therethrough of microwave energy passing through said waveguide and a high impedance for said high frequency electromagnetic field energy applied to said ferrite element.

5. A device for producing a predetermined rotation of electromagnetic wave energy propagated through a waveguide comprising a section of waveguide adapted to receive electromagnetic wave energy and having a longitudinal slot extending along said waveguide, and ferrite element means positioned within said waveguide, means positioned in the region of said ferrite element for providing a high frequency electromagnetic field for polarization rotation of said microwave energy propagated in said ferrite element in a predetermined angular direction, means including electrically conductive particles substantially smaller than a quarter wavelength of the operating frequency of said waveguide interposed between said field-producing means and said waveguide for providing a microwave short across the longitudinal slot to prevent passage therethrough of microwave energy passing through said waveguide and a high impedance for said high frequency electromagnetic field energy applied to said ferrite element.

6. In combination, a section of waveguide adapted to receive and support electromagnetic energy and containing a longitudinal slot therein, a pair of metal flanges connected to each end of said waveguide and adapted to connect said waveguide section to another section of waveguide, each of said flanges containing an arcuate slot extending from said longitudinal slot in a direction concentric to the axis of said waveguide for a greater portion of the distance around each flange, a layer of conductite material surrounding the outer surface of said waveguide and embedded in said longitudinal and arcuate slots, and magnetic field producing means supported by said conductite material for producing a polarization rotation of said electromagnetic energy.

7. In combination, a section of waveguide adapted to receive and support polarized electromagnetic microwave energy and containing a slot extending in a longitudinal direction, a metallic flange extending in a perpendicular direction from each end of said waveguide section and adjacent said longitudinal slot, a second slot in each flange in register with said first slot and extending in an arcuate direction concentric to said waveguide for a greater portion of the distance around said flange, frequency selective material adapted to present a mismatch to said microwave energy enclosing the outer surface of said waveguide and embedded in said longitudinal and arcuate slots, and magnetic field producing means supported by said frequency selective material for producing a polarization rotation of said electromagnetic microwave energy.

8. In combination, a section of waveguide adapted to receive and support electromagnetic energy and having a longitudinal slot therein, ferrite element means positioned along the longitudinal axis of said waveguide, a frequency-selective material comprising a dielectric material impregnated with conductive metallic particles substantially smaller than a quarter wavelength of the operating frequency of said waveguide embedded in said slot to provide a shorted section to prevent passage therethrough of said electromagnetic energy, said material enclosing the outer surface of said waveguide, and means supported by said frequency-selective material for providing a polarization rotation of said electromagnetic energy propagated in said ferrite element.

9. A device for producing rotation of polarized microwave energy comprising a circular waveguide receptive of said microwave energy and containing a longitudinal slot extending the length of said waveguide, a frequency selective material comprising epoxy impregnated with aluminum particles substantially smaller than a quarter wavelength of the operating frequency of said waveguide embedded in said longitudinal slot to provide a shorted section to prevent passage of said microwave energy through said slot, said material enclosing the outer surface of said waveguide, means supported by said frequency selective material for providing a magnetic field to produce polarization rotation of said electromagnetic energy flowing through said waveguide.

10. A device for producing rotation of polarized microwave energy comprising a waveguide adapted to receive said microwave energy and containing a longitudinal slot therein, a ferrite element positioned in the path of said microwave energy in said waveguide, frequency selective material comprising electrically conductive particles substantially smaller than a quarter wavelength of the operating frequency of said waveguide distributed in a solid insulating material and embedded in said slot and surrounding the outer surface of said waveguide to provide a shorted section to prevent passage of microwave energy through said slot, a magnetic field producing coil supported by said frequency selective material and positioned out of contact with said waveguide, and an alternating current source of energy feeding said field coil, said frequency selective material shorting said longitudinal slot to said microwave energy traversing said waveguide and presenting a high impedance path to said alternating current energy.

11. In combination, a section of circular waveguide adapted to receive and support polarized microwave energy and containing a longitudinal slot extending the entire length of said waveguide section, a metallic flange connected to each end of said waveguide section, each flange containing an arcuate slot in register with said longitudinal slot at a point substantially equidistant from the ends of each arcuate slot, each of said slots extending in a direction concentric to said waveguide to a portion of the distance around said flange, frequency selective material embedded in each slot and surrounding the outer surface of said waveguide, a field coil supported by said frequency selective material in the region of said ferrite element, an alternating current source of energy connected to said field coil, said frequency selective material acting as a metallic conductor for said microwave energy traversing said waveguide and as a high impedance path to said alternating current energy driving said field coil.

12. In combination, a section of circular waveguide adapted to receive and support polarized microwave energy and containing a longitudinal slot extending the entire length of said waveguide section, a metallic flange connected to each end of said waveguide section, each flange containing an arcuate slot in register with said longitudinal slot at a point equidistant from the ends of said arcuate slot and extending in a direction concentric to said waveguide for a portion of the distance around said flange, frequency selective material embedded in each slot and surrounding the outer surface of said waveguide, a field coil supported by said frequency selective material in the region of said ferrite element, an alternating current source of energy connected to said field coil, said frequency selective material acting as a metallic conductor for microwave energy traversing said waveguide and as a high impedance path to said alternating current energy driving said field coil.

13. In combination, a section of circular waveguide adapted to receive and support polarized microwave energy and containing a longitudinal slot extending the entire length of said waveguide section, a metallic flange connected to each end of said waveguide section, each flange containing an arcuate slot concentric to the axis of said waveguide and in register with said longitudinal slot, a ferrite element positioned within said waveguide, a magnetic field producing coil, and conductite material forming a spacer for said magnetic field production coil surrounding the surface of said waveguide and imbedded in said arcuate and longitudinal slots, said conductite presenting a low impedance to prevent passage through said spacer of microwave energy and a high impedance to high frequency energy.

14. A device for producing rotation of polarized electromagnetic wave energy comprising a waveguide having a longitudinal slot and receptive of said electromagnetic wave energy, a ferrite element positioned within said waveguide, means for producing a high-frequency modulating magnetic field in the region of said ferrite element parallel to the direction of propagation of said electromagnetic wave energy, a flange connected to each end of said waveguide, each flange containing a circular slot and in register with said longitudinal slot and spacing means surrounding the outer surface of said waveguide and embedded in said circular and longitudinal slots, thereby supporting said modulating field producing means a predetermined distance from the surface of said waveguide, said spacing means adapted to present a relatively high impedance to said modulating magnetic field and a mismatch to prevent electromagnetic wave energy leakage through said waveguide slot.

15. A device for producing rotation of a polarized electromagnetic wave comprising a waveguide receptive of said electromagnetic wave energy, a ferrite element positioned within said waveguide, a longitudinal slot extending along said waveguide in the region of said ferrite element, a winding surrounding said waveguide for providing an axial magnetic field in the region of said ferrite element substantially parallel to the direction of propagation of said electromagnetic wave energy, and an element including conductive particles substantially smaller than a quarter wavelength of the operating frequency of said waveguide and having a substantial impedance at the maximum frequency of variation of said magnetic field and a sufficiently low impedance at the frequency of said electromagnetic wave energy substantially to close said slot to prevent by reflection electromagnetic wave energy from passing through said slot.

References Cited in the file of this patent
UNITED STATES PATENTS

| | | |
|---|---|---|
| 2,443,109 | Linder | June 8, 1948 |
| 2,496,837 | Woodyard | Feb. 7, 1950 |
| 2,557,261 | Collard | June 19, 1951 |
| 2,802,184 | Fox | Aug. 6, 1957 |
| 2,820,200 | Du Pre | Jan. 14, 1958 |
| 2,858,451 | Silversher | Oct. 28, 1958 |

FOREIGN PATENTS

| | | |
|---|---|---|
| 1,136,833 | France | Jan. 7, 1957 |